(12) United States Patent
Mallow

(10) Patent No.: US 7,011,698 B2
(45) Date of Patent: Mar. 14, 2006

(54) STABILIZED BIOCIDAL COATING COMPOSITION AND METHOD

(75) Inventor: William A. Mallow, San Antonio, TX (US)

(73) Assignee: Alistagen Corporation, New York, NY (US)

( * ) Notice: Subject to any disclaimer, the term of this patent is extended or adjusted under 35 U.S.C. 154(b) by 58 days.

(21) Appl. No.: 10/476,732

(22) PCT Filed: May 2, 2002

(86) PCT No.: PCT/US02/13685

§ 371 (c)(1),
(2), (4) Date: Jun. 1, 2004

(87) PCT Pub. No.: WO02/090428

PCT Pub. Date: Nov. 14, 2002

(65) Prior Publication Data

US 2004/0194656 A1 Oct. 7, 2004

(51) Int. Cl.
*C09D 5/14* (2006.01)

(52) U.S. Cl. ............... 106/15.05; 106/16; 106/792; 106/795; 106/805

(58) Field of Classification Search ............. 106/15.05, 106/16, 792, 795, 805
See application file for complete search history.

(56) References Cited

U.S. PATENT DOCUMENTS

| 5,124,389 | A | * | 6/1992 | Mente .................. 524/378 |
| 6,042,638 | A | * | 3/2000 | Mallow et al. ............. 106/792 |
| 6,231,650 | B1 | * | 5/2001 | Mallow et al. ............... 106/16 |
| 6,280,509 | B1 | * | 8/2001 | Mallow ................... 106/15.05 |

\* cited by examiner

*Primary Examiner*—Paul Marcantoni
(74) *Attorney, Agent, or Firm*—Marl H. Miller; Jackson Walker LLP

(57) ABSTRACT

A biocidal film-forming composition, preferably a paint, is disclosed, comprising hydrated lime, alkaline potassium salt, and a non-ionic polyolefinic latex resistant to hydrated-lime induced coagulation and phase separation. Also disclosed is the method of making certain such composition wherein hydrated lime is admixed with a non-ionic polyolefinic ester latex with agitation and continuing such agitation until hydrolysis of the ester is substantially completed and rheology of the composition is stabilized and the incidence of gelation is eliminated.

32 Claims, No Drawings

STABILIZED BIOCIDAL COATING COMPOSITION AND METHOD

BACKGROUND OF THE INVENTION

The instant invention relates to biocidal coating compositions, particularly paints, in which hydrated lime is used as a biocidal agent and a method of making certain such compositions and paints more particularly, the present invention relates to a method for increasing the shelf life of such compositions.

Hydrated lime is well known as a disinfectant, biocidal, and biostatic agent its effectiveness for these purposes is based on its high alkalinity, a pH above about 11, in order to retain its biocidal activity after application to a desired surface, a hydrated lime must retain the high alkalinity necessary to kill microorganisms.

Unfortunately, hydrated lime is highly susceptible to environmental attack, primarily by carbon dioxide present in the ambient atmosphere. Carbon dioxide converts the hydrated lime to calcium carbonate, which does not have the alkalinity required to kill microorganisms. Such a consequence has mitigated against the use of hydrated lime in coating compositions, such as paints and whitewash, as effective long term disinfectants, biocides, or biostatic agents.

The prior U.S. Pat. Nos. 6,280,509, 6,231,650 and 6,042,638, whose entire disclosures are hereby specifically incorporated by reference, disclose coating compositions which have overcome this problem and are effective coatings that resist degradation by carbon dioxide for prolonged periods of time. Such compositions, however, may not be truly washable or cleanable with aqueous materials and their use is thereby limited. Also, it was not possible to use with such compositions the conventional latex vehicles used in forming paints which employ anionic or cationic surfactants and emulsifiers.

Most interior building paints are based on a latex vehicle and their popularity results from their easy application, low odor, good appearance, and ability to be cleaned with soap and water.

As noted in the prior parent applications, such conventional latex binders were incompatible with hydrated lime which results in coagulation and phase separation almost immediately upon blending with lime.

The present invention provides a method and composition for aforementioned paints which allows the paints to have greater shelf life and reduces the hardening, thickening and cross linking of the paints during their useful life.

SUMMARY OF INVENTION

The present invention overcomes the problems noted above to provide stable biocidal compositions containing hydrated lime and a latex binder that resists the effects of degradation by the hydrated lime and provides for the prevention of gelation. An important aspect of this stablization is pH control. The pH is optimally kept at about pH 12 to about pH 13. It has been found that the addition of an alkali such as an alkali metal hydroxide or alkaline alkali metal salts is a preferred modes of pH control. While potassium is the preferred alkali metal, others such or sodium may be used. The most particularly preferred material for stabilization is potassium carbonate ($K_2CO_3$). Any alkaline potassium salt is usable, a list being too lengthy to provide here but comprises the result of reacting potassium hydroxide with any weak acid.

Briefly stated, the present invention comprises biocidal film-forming compositions, particularly paints, comprising a hydrated lime, non-ionic polyolefinic latex resistant to hydrated lime-induced coagulation and phase separation which maintain their biocidal activity after being applied to a substrate for extended periods of time. The invention also comprises the method of making certain such compositions.

DETAILED DESCRIPTION OF THE PREFERRED EMBODIMENT

The compositions of the present invention are particularly suited as coatings and paints for substrates where the dried coating formed by the composition and paint maintains a biocidal activity for extended periods of time; i.e., at least one month, and preferably for a period of years.

Such activity is desired, for example, in hospitals, nursing homes, food preparation facilities (such as factories making food products, restaurants, school cafeterias, and the like), dining facilities, areas where large numbers of people congregate (such as schools, offices, arenas, and the like) and HVAC systems everywhere to help eliminate or reduce the spread of deleterious microorganisms.

Important components of the compositions of the present invention include hydrated lime and non-ionic polyolefinic latex resistant to hydrated lime-induced coagulation and phase separation. Such adverse effects are possibly due to hydrolysis caused by the lime.

As used herein, the phrase "resistant to hydrated lime-induced coagulation and phase separation" means a non-ionic latex resistant to such coagulation and phase separation ab initio, or, as hereinafter described, a substance described above treated during admixture with potassium hydroxide, $K_2CO_3$ to prevent coagulation and phase separation.

Examples of ab initio hydrolysis resistant or other alkaline alkali metal salt or non-ionic polyolefinic latices are non-ester containing non-ionic latices, such as styrene-butadiene, butadiene-acrylonitrile, butadiene-styrene-acrylonitrile, and chloroprene in non-ionic latex emulsion form or mixtures thereof. Of these, a carboxylated styrene-butadiene latex (TYLAC 812 from Reichhold Chemical Co.) is preferred.

Polyolefinic latices that can be treated during admixture with lime to prevent coagulation and phase separation are the latex copolymers containing an ester, such as polyacrylate/ethylene copolymers (such as NANCRYLIC CP3600 from National Starch Co.), polyvinyl acetate/ethylene copolymers (such as COPOLYMER 525BP or 526BP from Air Products Co.) and polyvinyl chloride/ethylene copolymers or mixtures thereof.

All of the foregoing non-ionic polyolefinic latices are suitable binders which will form films and are suitable for use in forming paints, but preferred are the non-ester containing latices, in particular carboxylated styrene-butadiene latex, because they eliminate the need for the special processing required for ester-containing latices and are more stable.

To be suitable as a water-washable biocidal film-forming paint there must be sufficient latex in the composition to form a coherent film capable of passing the ASTM tests for resistance of running water (D2247), stain removal (D3258), and sponge cleaning (14824) and a high ratio, on a solids basis, of lime to latex to ensure sustained biocidal activity.

For paint usage there must also be sufficient latex to enable the finished biocidal paint to pass the standard ASTM test for 90 degree bending flexure (D5222), scratch abrasion resistance (D2486), and industry tests for resistance to "chalking off."

The instant compositions and paints can be applied in any of the conventional ways utilized for paints; i.e., brushing, rolling, spraying, and the like.

To accomplish the foregoing purposes there must be at least about 1 part by weight (on a solids basis) of the latex for about 8 parts by weight of the other solids in the paint; i.e., at least about 10 to 11% by weight, on a solids basis for flat paint and, as is known and conventional, larger amounts of latex in enamel or gloss paints. Such other solids are the hydrated lime, fillers, pigments, and thickeners. It will be understood that the higher the latex solids contents of the paint the longer the "life" of the paint; i.e., the length of time it maintains its appearance before repainting is required. For a long-life paint, such as a 20-year paint, a latex to other solids ratio of 1 to 3 is preferred.

For optimum biocidal activity over an extended period of time, at least one month, the weight ratio of hydrated lime to latex, on a solids basis, should be about 1:2 to 1:1.5. While a lower ratio of lime can be used, it reduces the length of time available to exert its biocidal effect on organisms.

In paint formulations the usual and conventional additives in preparing water-based latex paints are utilized in addition to the hydrated lime. Namely, non-ionic surfactants (alkyl phenol ethers of polyethylene glycol, such as TRITON X-100 and CF1- from Rohm & Haas, etc.); protective colloids which act as dispersing agents (such as Castament FS10 by SKW Co.); fillers or extenders (such as titanium oxide, talc, calcium carbonate, etc.) used to opacify the latex; a pigment or pigments (all conventional) for the desired hiding, color, and gloss; coalescing solvents to plasticize the latex temporarily during film formation so that the latex particles coalesce into a film; thickener additives (such as colloidal silica, colloidal clay, low molecular weight hydroxypropylmethyl cellulose, etc.) to thicken the paint to promote suspension of the pigment(s) during storage, proper rheology for application, and for flow without sagging when the paint is applied to a surface; antifoaming agents (such as TROYKYD D-126 from Troy Chemical Co., or DF210 from Air Products Company silicone fluids, dimethylpolysiloxanes, etc.) to minimize foaming; agents to prevent agglomeration by freezing; and the like conventional additives. These additives are added in the usual amounts for their usual effects, it being understood that the solids ratio of latex to all solids be as noted above and that the hydrated lime to latex ratio also be as noted. When a carboxylated styrene-butadiene latex is used as the binder the process of making the coating composition is that conventionally used in making conventional latex paints. This involves the conventional grinding, mixing, and thinning adjustments and, of course, filling the composition into suitable containers which are then labeled. Grinding is an important step and involves the use of high speed dispersers which are large tanks equipped with high speed rotating impellers of various shapes. The time and impeller speeds required for grinding, mixing, and the like will, as is known, vary, dependent mainly on the particular components used in making the composition and the processing equipment. The particular times and speeds are readily determined by the conventional procedures used in the paint industry.

The use of these conventional high speed dispersers is especially important when the binder used is a non-ionic polyolefinic ester. As previously noted, if simply admixed with the hydrated lime, such latices will coagulate and phase separate either immediately or at most in a few days. It has surprisingly been found that if the agitation is continued after the latex and hydrated lime are first admixed until hydrolysis of the ester group is completed and rheology is stabilized, the a will remain fluid and prevent precipitation of the calcium salt. The resultant composition will form a less resilient, but suitable coating that is biocidal. The precise length of such mixing will vary dependent upon the particular latex used and ratio of hydrated lime to latex, and is generally in the range of 7–14 days, but can be readily determined by routine experimentation since inadequate length of mixing will result in gelling and/or precipitation of the calcium salt, which conditions are readily observable. It has been found that such continuous agitation is not effective with the anionic latices, and they cannot, at least readily, be used to form biocidal coatings with the hydrated lime.

An added benefit of the instant paints is that they offer long term corrosion resistance. As a result, the conventional corrosion barrier coatings used in water-based latex paint containers are not required for the instant paints because lime is a well-known corrosion inhibitor for iron-based metals. Also, the instant paints can be used to paint steel reinforced concrete surfaces to inhibit carbon dioxide penetration and consequent loss of corrosion-inhibiting lime components of the concrete. This minimizes the corrosion of the steel reinforcement and extends the life of the concrete structure.

While the precise theory is not completely understood, it is believed that the large amount of hydrated lime in respect to the latex previously noted above ensures that the lime content is continuously reactive and presents a highly alkaline surface to the coatings formed when the composition is applied to a substrate. Soon after application, the exposed hydrated lime carbonates due to atmospheric carbon dioxide and forms a protective layer against carbon dioxide permeation. However, such carbonate layer is made of particulate solids in a matrix of latex and cellulose highly permeable to water vapor and the intrusion of moisture by capillarity and microorganisms. The hydrated lime just below this permeable layer is thus protected against carbonation and retains its biocidal pH of over 11 for extended periods of time; at least one month and, based on accelerated aging tests, for a period of years. The invention involves an effective amount of potassium hydroxide, potassium carbonate, or tribasic potassium phosphate to prevent the early thickening and solidification of the product. A the present time potassium carbonate ($K_2CO_3$) is preferred although other alkaline potassium salts will also stabilize the latex preparations.

Wide variations in the composition of municipal water supplies make it prudent to utilize deionized water or distilled water in the preparation of the invention.

The invention will be further described in connection with the following examples which are set forth for purposes of illustration only.

In the examples that follow all the proportions are in parts by weight of solids unless expressly stated to the contrary. Also, the measurement of the length of time the hydrated lime retained a biocidal alkalinity in the coating as set forth in the examples was measured by an accelerated aging test. For each composition tested, three Leneta boards were coated with a 3–4 mil dry thickness of the composition following the ASTM test D4941 and each of the boards placed in a impermeable plastic container having a 100% carbon dioxide atmosphere (versus about 0.033% carbon dioxide in air). The pH of the boards is measured weekly with each week of exposure to the 100% carbon dioxide atmosphere being equivalent to approximately 64 weeks of exposure to atmospheric when carbon dioxide per week of exposure, due to the 3,000-fold concentration increase of $CO_2$ over atmospheric. When a 3 mil layer of calcium hydroxide is exposed to 100% carbon dioxide for one day without the binder formula it totally carbonated. The draw down on the Leneta boards also measures hiding power.

Although tribasic potassium phosphate is listed for many of these examples, dibasic potassium carbonate ($K_2CO_3$) has been analogously used and found to be preferred.

EXAMPLE 1

A composition was prepared utilizing the following constituents (Parts by weight):

| | |
|---|---|
| Latex (COPOLYMER 525BP) | 200 (55% by wt. solids) |
| Dispersing agent (CASTAMENT FS10) | 1 |
| Hydrated lime | 50 |
| Calcium carbonate | 50 |
| Titanium dioxide | 150 |
| Hydroxypropylmethyl cellulose | 6 |
| Non-ionic surfactants: | |
| TRITON X-100 | 2 |
| TRITON CF100 | 1 |
| Antifoaming agent (DF210) | 0.5 |
| Potassium Phosphate Tribasic | 1.65 + 1.65 $H_2O$ |
| Water | 250 |

The lime, carbonate, titanium dioxide, non-ionic surfactant, and 200 parts of the water were first ground in the conventional manner used in making latex paints to form a finely dispersed mixture. To the ground mixture were then added the latex, antifoaming agent, a phosphate salt, and remaining water, with gentle mixing until the latex is substantially uniformly dispersed throughout the mixture approximately five minutes, followed by addition of the cellulose and additional antifoaming agent, again as is usual in making paints.

The mixing is continued until hydrolysis of the ester is completed; i.e., at least about seven days.

The composition is subjected to the accelerated aging test noted above and maintains its biocidal activity for a period greater than one month.

EXAMPLE 2

A composition was prepared utilizing the following constituents:

| | |
|---|---|
| Latex 9NANACRYLIC CP 3600) | 200 (55% by wt. solids) |
| Propylene glycol ester | 5 |
| Hydrated lime | 100 |
| Calcium carbonate | 100 |
| Titanium dioxide | 100 |
| Non-ionic surfactant (TRITON X-100) | 1 |
| Potassium Phosphate Tribasic | 1.65 + 1.65 $H_2O$ |
| Water | 200 |

The processing set forth in Example 1 was followed except that no thickener or antifoaming agent was used and mixing was not continued after the time thorough mixing of the constituents was completed.

The result was that a stiff fluid formed within 24 hours which was unsuitable as a coating-forming composition.

EXAMPLE 3

A composition was prepared utilizing the following constituents:

| | |
|---|---|
| Latex (NANCRYLIC CP 3600) | 200 |
| Dispersing agent (CASTAMENT FS10) | 1 |
| Hydrated lime | 50 |
| Titanium dioxide | 150 |
| Non-ionic surfactants: | |
| TRITON X-100 | 1 |
| TRITON CF100 | 0.5 |
| Potassium Phosphate Tribasic | 1.65+ 1.65 $H_2O$ |
| Water | 250 |

The procedure of Example 1 was followed except that the mixing was continued until hydrolysis of the ester was completed, about one week. The result was a stable composition that did not thicken into an unusable form which cast films that maintained its biocidal activity for several years when tested using the accelerated aging test noted above.

EXAMPLE 4

The composition and processing set forth in Example 1 are followed, except that an equivalent amount of non-ionic polyvinyl chloride/ethylene copolymer used therein.

A suitable paint composition is formed which maintained its biocidal activity for over one month when subjected to the noted accelerated aging test.

EXAMPLE 5

A composition was prepared utilizing the following constituents:

| | |
|---|---|
| Latex (TYLAC 812) | 200 (43.5% by wt. solids) |
| Propylene glycol ester | 5 |
| Hydrated lime | 100 |
| Calcium carbonate | 50 |
| Titanium dioxide | 100 |
| Hydroxypropylmethyl cellulose | 5 |
| Non-ionic surfactant (TRITON X-100) | 1 |
| Antifoaming agent (DF10) | 0.5 |
| Potassium Phosphate Tribasic | 1.65 + 1.65 $H_2O$ |
| Water | 200 |

The constituents were ground and admixed as set forth in Example 1 except that no mixing was required after admixing of the constituents was completed.

The composition was then subjected to the afore noted accelerated aging test and as of the date of filing of the instant application still maintained its biocidal activity and over 70% of the calcium hydroxide content after 4.5 years of actual weathering outdoors.

EXAMPLES 6–9

The composition and processing of Example 5 are followed except that separately each of the following non-ionic latex emulsions are substituted in an equal part by weight for the TYLAC 812; butadiene-acrylonitrile, butadiene-styrene-acrylonitrile, and chloroprene.

In each instance excellent stable paints are formed which, when applied to surfaces, maintain their biocidal activity for a period of at least one month.

EXAMPLE 10

Stable Biocidal Latex Based on 100 Gallons

| Tp Description | Pound | Gallons | % Wt. |
|---|---|---|---|
| WATER | 296.269 | 35.567 | 27.44 |
| TYLAC 812 | 247.567 | 29.281 | 22.95 |
| SURFYNOL DF-210 | 9.740 | 1.285 | 0.90 |
| CALCIUM CARBONATE | 109.092 | 5.457 | 10.104 |
| TITANIUM OK100 | 138.881 | 4.168 | 12.86 |
| CALWHITE | 109.092 | 4.833 | 10.104 |
| SURFACTANT CT-121 | 8.929 | 1.031 | 0.827 |
| CASTAMENT FS10 | 5.682 | 0.546 | 0.53 |
| CULIMINAL MHPC 5 | 24.919 | 3.323 | 2.31 |
| POTASSIUM CARBONATE (TECHNICAL) | 14.611 | 0.723 | 1.35 |
| TRIPROPYLENE GLYCOL | 44.643 | 5.252 | 4.13 |
| FOAM BLAST 383 | 5.357 | 0.723 | 0.497 |
| CULMINAL MHPC 12000 2.5% S | 64.936 | 7.812 | 6.014 |

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

Persons skilled in the art will appreciate that potassium phosphate or other alkaline potassium salts such as, e.g. potassium carbonate may combine with calcium hydroxide (lime) to produce potassium hydroxide and calcium phosphate, carbonate, etc., in the invention as described. Potassium hydroxide is the ultimate force in the invention's biocidal activity. Its precursor, potassium carbonate or phosphate, e.g., however, is discussed as the initial reagent because it is easier to handle than potassium hydroxide. Accordingly, while potassium phosphate and potassium hydroxide can be used somewhat interchangeably in the invention, potassium carbonate or phosphate is referred to herein in describing and claiming the invention as the preferred precursor material. It is to be understood, however, that, in limited situations, the invention may be practiced by directly using potassium hydroxide at the beginning point of the process. The invention process would, in that event, be the some process as described and claimed herein and use of the term "potassium phosphate" herein is intended to include potassium carbonate and potassium hydroxide in such situations with such modifications as are apparent to those skilled in the art.

What is claimed is:

1. A biocidal film-forming composition comprising:
   hydrated lime and non-ionic polyolefinic latex resistant to hydrated lime-induced coagulation and phase separation, said lime present in an amount sufficient to maintain biocidal activity for a period of at least one month when the composition is applied as a film to a surface; and
   a sufficient amount of alkali to keep the pH between about 12 and about 13 to prevent gelation during storage.

2. The composition of claim 1 where the alkali is an alkali metal hydroxide.

3. The composition of claim 1 where the alkali is an alkali metal salt.

4. The composition of claim 1 where the alkali is potassium hydroxide or a potassium salt.

5. The composition of claim 1 where the alkali is potassium carbonate.

6. The composition of claim 1 wherein said latex is at least about 10% by weight of the total solids in the composition.

7. The composition of claim 1 wherein the ratio of hydrated lime to latex, measured in parts by weight of solids, is from about 1:2 to about 1:1.5.

8. The composition of claim 1 wherein said latex, is ab initio resistant to hydrated lime-induced coagulation and phase separation.

9. The composition of claim 8 wherein said latex is a styrene-butadiene, butadiene acrylonitrile, butadiene-styrene-acrylonitrile, or chioroprene in non-ionic latex form or mixture thereof.

10. The composition of claim 8 wherein said latex is a carboxylated styrene-butadiene latex.

11. The composition of claim 8 wherein said latex is a non-ionic latex copolymer containing an ester.

12. The composition of any one of claims 1 to 11 further defined as being in the form of a paint containing at least one pigment.

13. A biocidal flim-fonning paint comprising:
   a hydrated lime, said lime present in an amount sufficient to maintain biocidal activity for a period of at least one month when the paint is applied as a film to a surface;
   a non-ionic polyolefinic latex resistant to hydrated lime induced coagulation and phase separation;
   at least one paint filler;
   at least one paint pigment; and
   a sufficient amount of alkali to keep the pH between about 12 and about 13 to prevent gelation during storage.

14. The paint of claim 13 wherein said latex comprises at least 10% by weight of total solids in said paint.

15. The paint of claim 9 wherein the ratio of hydrated lime to latex, in parts by weight of solids, is from about 1:2 to 1:1.5.

16. The paint of claim 13 wherein said latex is ab initio resistant to hydrated lime-induced coagulation and phase separation.

17. The paint of claim 13 wherein said latex is a styrene-butadiene, butadiene acrylonitrile, butadiene-styrene-acrylonitrile, or chioroprene in non-ionic latex form or a mixture thereof.

18. The paint of claim 13 wherein said latex is a carboxylated styrene-butadiene latex.

19. The paint of claim 13 wherein said latex is a non-ionic latex copolymer containing an ester.

20. The paint of claim 13 wherein the latex is a carboxylated styrene-butadiene comprising at least about 10% by weight of the total solids in the composition and in which the ratio of hydrated lime to latex, in parts by weight of solids, being from about 1:2 to 1:1.5.

21. A method of making a biocidal film-forming composition comprising admixing hydrated lime, a non-ionic polyolefinic ester latex, a potassium salt and deionized or distilled water with agitation and continuing such agitation until hydrolysis of the ester is substantially completed and rheology of the composition is stabilized.

22. The method of claim 21 in which the latex is a polyacrylate/ethylene copolymer, polyvinyl acetate/ethylene copolymer, polyvinyl chloride/ethylene copolymer, or mixture thereof.

23. The method of claim 21 wherein the latex comprises at lease about 10% by weight of the total solids in the composition and the ratio of hydrated lime to latex, in parts by weight of solids, being from about 1:2 to 1:1.5.

24. A biocidal film forming composition, comprising:
   hydrated lime and non-ionic polyolefenic latex resistant to hydrated lime induced coagulation and phase separation, said lime present in an amount sufficient to maintain biocidal activity for a period of at least one month when the composition is applied as a film to a surface;

a sufficient amount of potassium hydroxide or a potassium salt to prevent gelation during storage;

said latex comprising at least about ten percent by weight of total solids in the composition;

the ratio of hydrated lime to latex measured in parts by weight of solids, being from about 1:2 to about 1:1.5;

said latex being ab initio resistant to hydrated lime induced coagulation and phase separation;

said latex selected from the group consisting of styrene-butadiene-acrylonitrile, butadiene-styrene-acrylonitrile, chloroprene, and carboxylated styrene-butadiene.

25. A biocidal film forming composition, comprising:

hydrated lime and non-ionic polyolefenic latex resistant to hydrated lime induced coagulation and phase separation, said lime present in an amount sufficient to maintain biocidal activity for a period of at least one month when the composition is applied as a film to a surface;

a sufficient amount of potassium hydroxide or a potassium salt to prevent gelation during storage;

said latex comprising at least about ten percent by weight of the total solids in the composition;

the ratio of hydrated lime to latex measured in parts by weight of solids, being from about 1:2 to about 1:1.5;

said latex being ab initio resistant to hydrated lime induced coagulation and phase separation.

26. A biocidal film-forming paint comprising:

a hydrated lime, said lime present in an amount sufficient to maintain biocidal activity for a period of at least one month when the paint is applied as a film to a surface;

a non-ionic polyolefinic latex resistant to hydrated lime induced coagulation and phase separation;

at least one paint filler;

at least one paint pigment; and a sufficient amount of alkali to keen the pH between about 12 and about 13 to prevent gelation during storage;

wherein, said latex being at least ten percent by weight of total solids in said paint;

the ratio of hydrated lime to latex in parts by weight of solids, being from about 1:2 to 1:1.5;

said latex being ab initio resistant to hydrated lime induced coagulation and phase separation;

said latex selected from the group consisting of styrene-butadiene, butadiene-acrylonitrile, butadiene-styrene-acrylonitrile, chloroprene, and carboxylated styrene-butadiene.

27. A biocidal film-forming paint comprising:

a hydrated lime, said lime present in an amount sufficient to maintain biocidal activity for a period of at least one month when the paint is applied as a film to a surface;

a non-ionic latex resistant to hydrated lime induced coagulation and phase separation;

at least one paint filler;

at least one paint pigment; and a sufficient amount of alkali to keen the pH between about 12 and about 13 to prevent gelation during storage, wherein, said latex comprising at least ten percent by weight of the total solids in said paint;

the ratio of hydrated lime to latex in parts by weight of solids, being from about 1:2 to 1:1.5;

said latex being ab initio resistant to hydrated lime induced coagulation and phase separation.

28. A method for making a biocidal film-forming composition comprising admixing hydrated lime, a non-ionic polyolefinic ester latex, alkali metal salt, and deionized or distilled water with agitation, and continuing such agitation until hydrolysis of the ester latex is substantially completed and rheology of the composition is stabilized by a potassium salt;

said non-ionic latex selected from the group consisting of a polyacrylate/ethylene copolymer, a polyvinyl acetate/ethylene copolymer, a polyvinyl chloride/ethylene copolymer, and mixtures thereof;

wherein, said latex comprising at least ten percent by weight of the total solids in the composition and a ratio of hydrated lime to latex, in parts by weight of solids, from about 1:2 to 1:1.5.

29. The composition of claim 13, wherein the alkali is an alkali metal hydroxide.

30. The composition of claim 13, wherein the alkali is an alkali metal salt.

31. The composition of claim 13, wherein the alkali is potassium hydroxide or a potassium salt.

32. The composition of claim 13, wherein the alkali is potassium carbonate.

* * * * *